DELAY DEVICE

Original Filed Aug. 28, 1944 2 Sheets-Sheet 1

INVENTOR.
SVEN H. M. DODINGTON
BY
Percy P. Lantzy
ATTORNEY

Aug. 2, 1960 S. H. M. DODINGTON 2,947,954

DELAY DEVICE

Original Filed Aug. 28, 1944 2 Sheets-Sheet 2

INVENTOR.
SVEN H. M. DODINGTON
BY Percy P. Lantzy
ATTORNEY 2,947,954

DELAY DEVICE

Sven H. M. Dodington, Nutley, N.J., assignor to International Telephone and Telegraph Corporation, a corporation of Maryland Original application Aug. 28, 1944, Ser. No. 551,470. Divided and this application Oct. 20, 1945, Ser. No. 623,467

2 Claims. (Cl. 333—30)

This invention relates to radio repeaters and more particularly to a delay device used in a repeater system for intercepting radio impulses or waves transmitted by radio locating systems and for transmitting in response thereto, simulated reflections of obstacles such as aircrafts and ships.

This is a division of my copending application for "Radio Repeater Systems," Serial No. 551,470, filed August 28, 1944, now Patent No. 2,794,668 which discloses pulse repeating and reflection falsifying systems which operate, in response to the reception of impulses or waves transmitted by a radio locating system, to transmit return pulses or waves of such strength, formation and time retardation as to simulate one or more ships or aircraft at some selected distance from the radio locating system.

It is an object of the invention to provide a device for producing repeat pulses having means for imparting to the repeat pulses a given delay, and/or multiplication of the pulses, in response to the received impulses.

Another object of the invention is to provide a method and means for producing in response to radio impulses a composite pulse signal and to effect substantially continuous change in the signal.

In accordance with my invention, I provide in a pulse repeating system comprised of a receiver for accepting the incoming impulse signal by heterodyning the radio frequency carrier of such signal with a locally produced oscillation, a delay device to produce pulses formed of a carrier at an intermediate frequency which are suitably amplified, multiplied in their response, and delayed with respect to the incoming signal, the produced pulses being subsequently re-transmitted, after heterodyning the above mentioned intermediate frequency carrier with the same locally produced oscillation in order to obtain the same outgoing frequency for the carrier as that of the incoming signal. For obtaining the delay and multiplication of the response pulses, the incoming impulses, at the intermediate frequency of the carrier are applied to electro-mechanical vibratile element such as a piezo-electric type quartz crystal, having a natural frequency which has a given relation to the said intermediate frequency and which is sufficiently damped to cover the required band width. The incoming impulse forces the crystal into oscillation at the pulse frequency, and sets up a supersonic type wave train in a liquid in which the crystal is immersed and through which the wave train is propagated at the speed of sound. (For purposes of definition, the expression "supersonic" as used here has reference to mechanical vibrations only.) A number of reflecting surfaces are positioned opposite the crystal within the liquid and in the line of travel of the waves set up by the crystal. The wave train emanating from the crystal is reflected from the surfaces at the far end of the liquid bath and on returning, strikes the crystal and induces a voltage thereacross. This voltage will, in the main, have the same wave shape as the voltage impulse applied to the crystal a few microseconds before, the delay being dependent on the distance between the crystal and the surfaces and the characteristics of the liquid. By using several reflecting surfaces at different distances and making use of the multiple reflections obtainable therefrom, it is possible to get a whole chain of repeat pulses in response to each of the impulses applied. A keying voltage which is triggered by the incoming impulses, may be provided for blanking out the undesirable portions of the response or repeat pulses so that only the desired group or portion of pulses may be re-transmitted and to permit alternate operation of the transmitter and receiver.

In order to further render the pulse repeating system to appear natural in its effect, the so-called "breathing effect," which is characteristic of indications of moving obstacles such as a squadron of ships or aircraft, is achieved in this instance by means of a variation in the length of the path of propagation through the liquid, or alternatives having a similar effect. I may also provide a non-mechanical alternative for achieving the "breathing effect," by continually varying the locally produced beat frequency in a given slow rhythm which, when combined with the fixed input and output frequencies of the carrier of the incoming impulses and the outgoing repeat pulses, results in a breathing or undulating pattern of the outgoing pulse trains.

The above and other features and objects of the invention will become clearer upon consideration of the following detailed description of the invention to be read in connection with the accompanying drawings in which.

Figure 1:
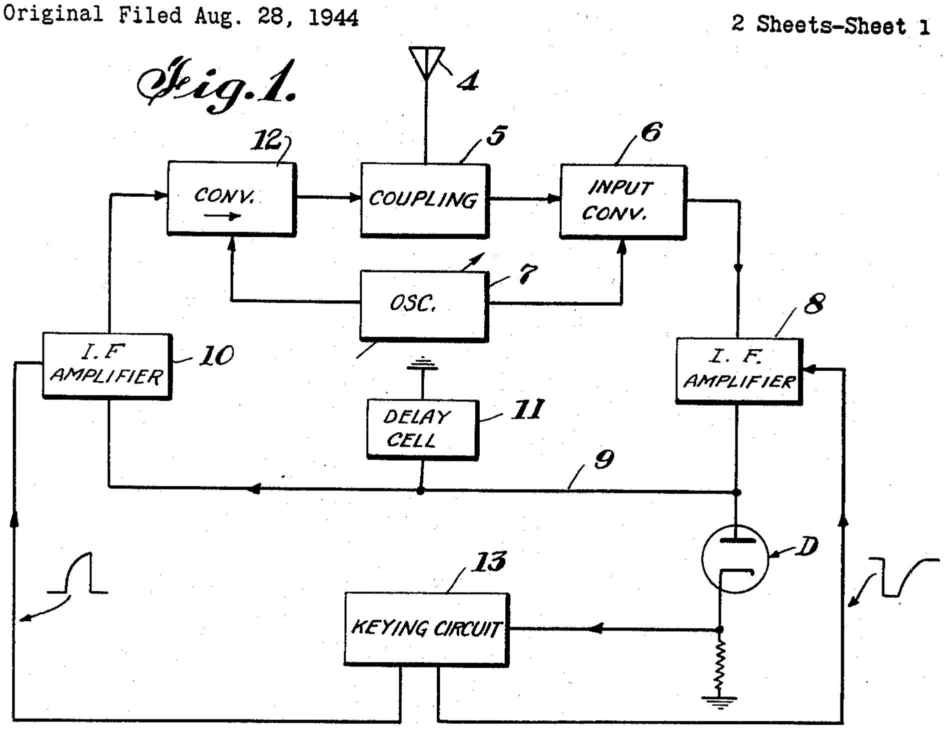
Fig. 1 is a schematic block diagram of a composite single repeater according to the principles of the invention.

The block diagram of Fig. 1 shows schematically the parts of the radio repeater system in accordance with the invention disclosed in my aforesaid copending application, Ser. No. 551,470. A two-way antenna 4 is connected to a transmitter-receiver comprised of a coupling unit 5 connected to an input converter 6 wherein the radio frequency or ultra high frequency of the carrier of the incoming radio impulses are beat down to a supersonic frequency by heterodyning against the output of a local oscillator 7 for application to a wide band I.F. amplifier stage 8.

Connected to the output connection 9 of the I.F. stage 8 is an output amplifier 10 which is connected to an output converter 12, wherein the intermediate frequency carrier energy, to which has been added delayed response or repeat pulse energy from a delay device 11 coupled to the output connection 9, is re-converted to the original incoming impulse carrier frequency by heterodyning against the output of the oscillator 7. The output converter 12 is connected to the coupling unit 5 feeding into antenna 4 now functioning in its transmission capacity.

A keying circuit 13, receiving its controlling impulses from a demodulator D of the output of the input amplifier 8, delivers a suitable keying voltage both to the output amplifier 10 and to the input amplifier 8 for blocking control thereof, so that the receiving and transmitting functions of the apparatus do not interfere, but follow one another with the frequency of the keying pulses. The demodulator D may be of the type as shown, that is a rectifier, or it may take the form of other arrangements capable of performing the same function. The keying pulses supplied to the input and the output amplifier, respectively, are shown adjacent the respective connecting leads in Fig. 1. These keying pulses may be obtained from the plate connections of a trigger type of multi-vibrator circuit, the grid of the second tube of which has been negatively biased to cut-off as, for instance, described in my copending application Serial No. 480,603, filed March 26, 1943, entitled, "Pulse Repeaters." Other circuits for producing blocking pulses of the type shown will occur to those skilled in the art.

Figure 2:
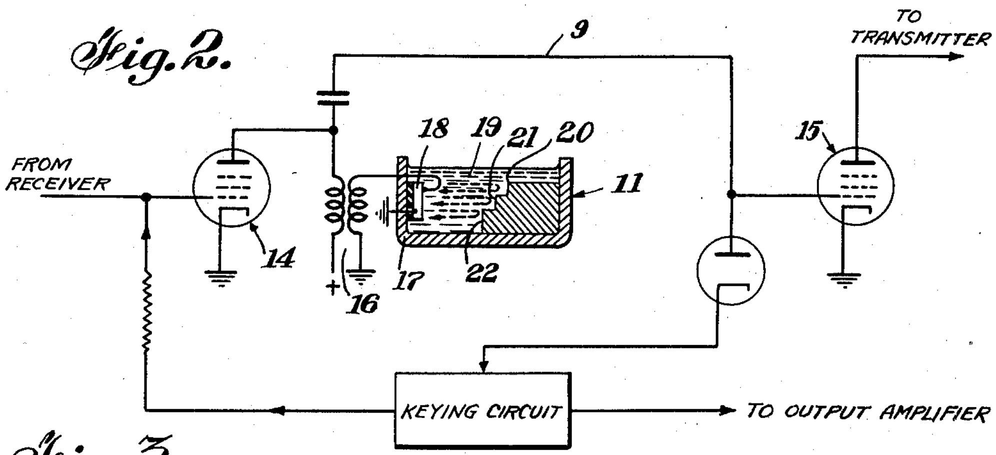
Fig. 2 is a schematic representation of a part of the circuit of Fig. 1 with the device for delaying the repeat pulses shown in longitudinal section.

Referring now to Fig. 2 a portion of the circuit of Fig. 1 is shown illustrating the relative arrangement and general functions of the delay device 11 which forms the essence of this invention. Inductively coupled at 16, to the outward connection 9 connecting the last stage 14 of the I.F. amplifier 8 with the first stage 15 of the output amplifier 10, there is shown the delay device 11. The delay device comprises a container 17 in which there is positioned a suitable electro-mechanical vibratile means which, for example, may be a piezo-electric type quartz crystal immersed in a liquid medium 19. At the far end of the container 17 a number of reflecting surfaces 20, 21 and 22 are combined in a single reflecting block as will be explained in detail hereinafter.

Figure 3:
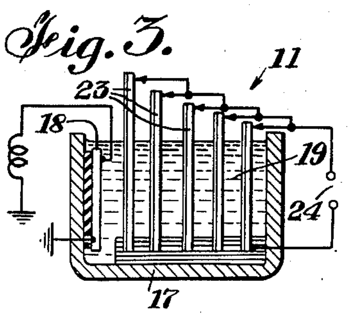
Fig. 3 is a section of an alternative form of a repeat pulse delay device, and Fig. 4, a plan view thereof.
Figure 4:
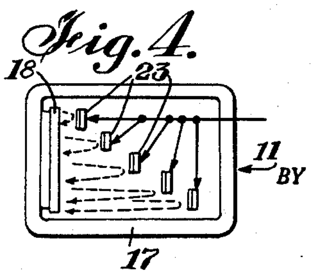

An alternative form for the delay device is shown in Fig. 3 where, in place of a single reflecting block, reflecting surfaces are provided by a number of bi-metallic strips 23, arranged at different distances from the crystal and through which a heating current is applied periodically at 24, whereby the strips are made to buckle periodically and thus vary their respective distances from the crystal in a given rhythm. In Fig. 4, there is a plan view of the delay device of Fig. 3 indicating the staggered positions of the reflecting bi-metallic strips in relation to the piezo-electric crystal.

Figure 5:
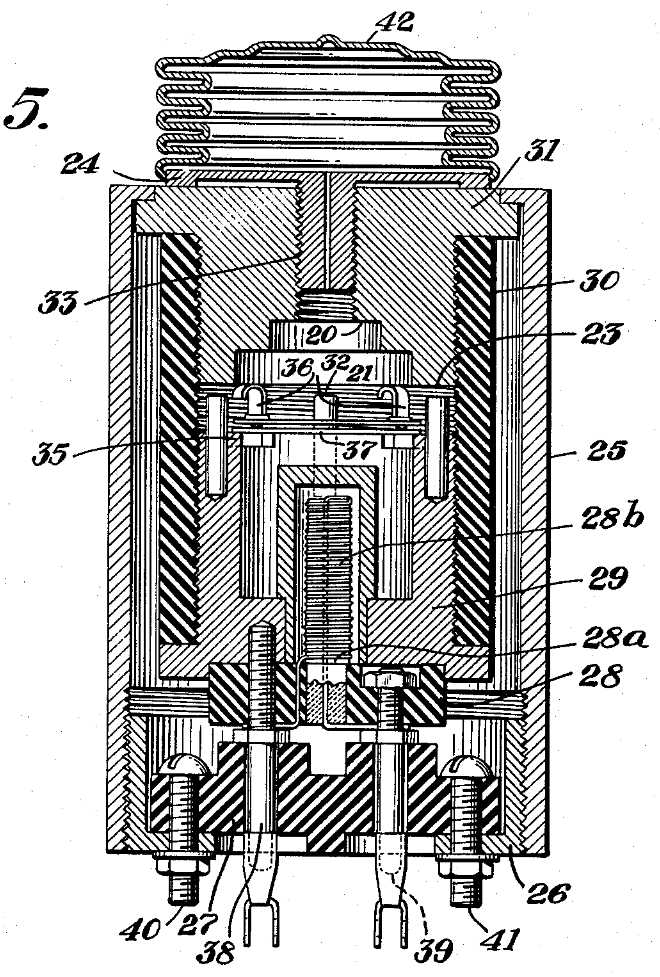
Fig. 5 is a view in vertical section of the mechanical construction of the delay device of Fig. 2.

In the embodiment of the delay device shown in longitudinal section in Fig. 5, a cylindrical metal container 25 is shown provided with a base member 26. Inside the container and mounted on the base 26, is an insulating block 27, on top of which is secured an electric heating unit comprising an insulating disc 28 and a ceramic member 28$a$ having wound thereon a heating wire 28$b$. The insulating disc 28 has secured thereto a cell element 29, which is placed over the heating unit for conduction of heat. The cell element 29, together with a cell sleeve 30 of non-conducting material and a cell top 31 forms an enclosed chamber at 32. A liquid medium having suitable properties may be injected into the chamber 32 through a filler cap 34 which serves to close an opening 33 in the cell top 31. The filler cap is provided with flexible brass bellows 42 which allows contraction and expansion of the liquid. The inner end of the cell base 29 is formed with an anular surface at 35 whereon is secured by means of the members 36, a quartz crystal 37 mounted between two aluminum members serving as electrical conductors and acoustic reflectors. The inside end of the cell top 31 is formed with a series of annular steps providing the reflecting surfaces 20, 21 and 23. A pair of connecting members 38 and 39 extending through the insulating block 27 serve to conduct heating current to the wire 28$b$ whereby the temperature of the liquid in the cell may be varied as desired, as well as to conduct electric impulse energy to the crystal through the cell member 29, which engages connection 38, the return being established through the other side of the crystal which is ground through the cell top 31 and the container or shell 25.

Fastening bolts 40 and 41 are shown securing the insulating member 27, and thereby the entire cell assembly to the base 26.

Figure 6:
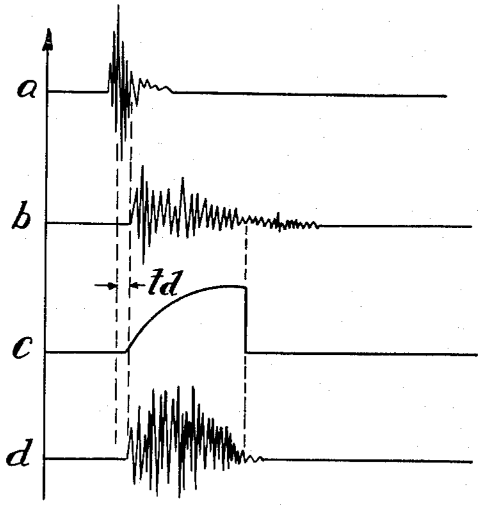
Fig. 6 is a graphical representation of the operation of the repeater system of Fig. 1.

The method of obtaining echo or repeat pulses which are properly delayed and multiplied in response to incoming impulses will now be described in connection with Fig. 6. The incoming pulse, the carrier of which has been heterodyned to an intermediate or supersonic frequency in the input converter, having the form as shown in graph $a$ is applied to the quartz crystal 18 (Fig. 2). The natural frequency of the crystal may be for instance ⅓ that of the I.F. and the crystal is sufficiently damped to cover the required band width. The incoming impulse forces the crystal into oscillation at the pulse frequency and sets up a wave or pulse train in the liquid which travels through the liquid at the speed of sound. This wave train is reflected from the surfaces 20, 21 and 22 and, on returning through the liquid, strikes the crystal and induces a voltage therein which will have substantially the wave shape as the voltage applied to the crystal by the incoming pulse, but be separated therefrom by a few microseconds representing the difference in point of time between the application of the impulses to the crystal and the inducement of the repeat pulse voltages in the crystal by the reflected supersonic pulses. The combined pulse form due to the multiple reflections is shown in graph $b$, the delay due to the time of travel from the crystal to the surfaces and back being indicated by the interval $t_d$. It is obvious, of course, that the reflecting surfaces may be varied in respect to their number and spacing so that various types of composite wave shapes may be obtained.

As indicated in Fig. 1 the keying circuit 13 will be triggered by the demodulated incoming pulse to set up a keying impulse of the type shown in graph $c$ which is effective in cutting off any undesired portions of the reflected pulses. The shape of the keying pulses, which of course may take other forms as desired, in this instance is such that maximum gain is obtained toward the end of the repeat pulse wave so as to compensate for the smaller reflections obtained at that point. The form of the pulse as finally re-transmitted in response to the original incoming pulse is shown in graph $d$. It will be noted that the original impulse is not re-transmitted, the beginning of the keying pulse being located to take into consideration the time delay $t_d$ and having such a form as to reduce the amplitude of any portion of the re-transmitted original pulse.

The delay in the liquid depends on the velocity of sound characteristic for the particular liquid chosen, water, for instance, giving a delay of about 7 microseconds per centimeter. Most other liquids will give a slightly greater delay. In this particular instance, and for the application suggested, a liquid having a low freezing point and whose attenuation of the wave train is relatively high, should be chosen. The liquid should also be non-inflammable.

In addition to generating the complex wave form in response to the incoming signal, it is also possible to obtain a random variation of the resultant wave form to simulate the so-called "breathing" produced by a true radio location system reflection. This effect may be had by introducing heat by means of the electric heating element 28 (Fig. 5). The resulting temperature gradient across the liquid produces a relatively substantial random change in the velocity of propagation in different parts of the liquid, resulting in greater and lesser delay of the reflected pulses. The envelope of the resultant complex wave of graph $d$ consequently is made to undulate and breathe in a manner not unlike that of a true radio locator reflection of a squadron of ships or aircraft in motion. In the alternative construction of the delay device in Figs. 3 and 4, wherein metallic strips serve as reflecting surfaces, such strips are made to buckle and move in response to heating currents. Another method for simulating the "breathing" effect is indicated in Fig. 1 where the local oscillator is shown to be variable, thus producing with the radio frequency carrier of the incoming impulses an intermediate frequency carrier impulse which slowly varies in its wave shape in accordance with the rhythm of variation in the frequency of the local oscillator.

In view of the fact that crystal harmonics necessitate a very large amount of amplification, it is necessary to use crystals at the highest possible frequency consistent with reliability. Since the supersonic frequency applied to the crystal in this case is effective in producing a wave having a length measured in hundredths of a millimeter in most liquids and only somewhat larger in most metals, reflecting systems to modify the response within a useful band must, therefore exhibit accuracies of a fraction of the wave length in liquids. The choice, therefore, was made to load the crystal with only the liquid, and to employ several crystals to cover the requisite band, using electrical circuits to compensate for inequalities between crystals.

While I have shown and described principles of my invention in connection with specific apparatus, it will be understood that the delay device may be considerably varied with respect to material used in the construction thereof as well as in the particular arrangement of parts. It will be understood, therefore, that the specific apparatus herein shown and described is to be regarded as illustrative of the invention only and not as limiting the scope thereof.

I claim:

1. A device, comprising means defining a chamber, a piezo-electric crystal having a given resonant frequency located in said chamber, means forming a plurality of supersonic pulse reflecting surfaces in said chamber, means for applying and taking off electrical impulse energy with respect to said crystal, a fluid medium in said chamber providing a path of propagation for supersonic pulses between said crystal and said reflecting surfaces, an element for heating said fluid medium whereby the propagating characteristics of said fluid medium may be varied, and means to apply an electric heating current to said element.

2. A device for producing a composite wave formation comprising means providing a chamber containing a medium adapted to convey mechanical vibration, means to initiate a mechanical vibration in said medium, a plurality of successively spaced bi-metallic elements having reflecting surfaces for multiple reflection of vibrations established in said medium, and means to apply heating current to said elements when the elements are in a certain condition to cause them to flex, whereby the reflecting positions of said surfaces are changed.

References Cited in the file of this patent

UNITED STATES PATENTS

| | | |
|---|---|---|
| 1,858,931 | Longevin et al. | May 17, 1932 |
| 2,248,870 | Longevin | July 8, 1941 |
| 2,263,902 | Percival | Nov. 25, 1941 |
| 2,405,591 | Mason | Aug. 13, 1946 |
| 2,407,294 | Shockley | Sept. 10, 1946 |

OTHER REFERENCES

Article entitled, "Ultra-sonic Measurements of the Compressibility of Solutions and of Solid Particles in Suspension," published in Bureau of Standards—Journal of Research, vol. 8, January 1932, pages 79–96.